HERBERT C. OTIS
INVENTOR.

Sept. 4, 1951 H. C. OTIS 2,566,772
SAFETY CONTROL VALVE
Filed Feb. 4, 1947 2 Sheets-Sheet 2

HERBERT C. OTIS
INVENTOR.

BY *J. Vincent Martin*
*Ralph R. Browning*
*James B. Simms*
ATTORNEYS

Patented Sept. 4, 1951

2,566,772

UNITED STATES PATENT OFFICE 2,566,772

SAFETY CONTROL VALVE

Herbert C. Otis, Dallas, Tex.

Application February 4, 1947, Serial No. 726,373

28 Claims. (Cl. 137—153)

This invention relates to improvements in valves and refers more particularly to valves having a pressure actuated mechanism for shifting the valve closure member in response to the pressure of a control fluid. This invention may be used for example in conjunction with pipe lines wherein the valve serves as a safety device to control the flow of fluid through the pipe line in response to changes in the pressure of the control fluid.

Heretofore safety devices have been provided. However, they have not proven entirely satisfactory because of the tendency of the valve to chatter as the pressure of the control fluid approaches the critical limit for shifting the valve closure member. It is desirable that the actuating mechanism for the closure member of the valve shall work with a snap action to positively shift the valve when the control pressure reaches the critical selected limit.

An object of this invention is to provide a rugged pressure responsive valve wherein the closure member is positively shifted when the pressure of a control fluid reaches a predetermined limit.

Another object is to provide a pressure responsive valve wherein the valve closure member is shifted with a snap action when a control pressure reaches a predetermined limit.

A further object is to provide a pressure controlled valve in which the closure member is positively shifted when a control pressure reaches either an upper or lower predetermined limit.

Still another object is to provide a pressure actuated mechanism for shifting the closure member of a valve in response to a control pressure wherein the mechanism operates with a snap action and is sensitive to a critical predetermined control pressure limit.

A still further object is to provide a rugged pressure responsive valve in which the position of the valve closure member may be visually determined from the exterior of the valve.

Yet another object is to provide a pressure responsive valve wherein the closure member is shifted to one position in response to a control pressure and may be manually shifted to its other position.

Other and further objects will appear from the following description:

In the accompanying drawings which form a part of the instant specification and are to be read in conjunction therewith and wherein like reference numerals are used to designate like parts in the various views.

Figure 1:
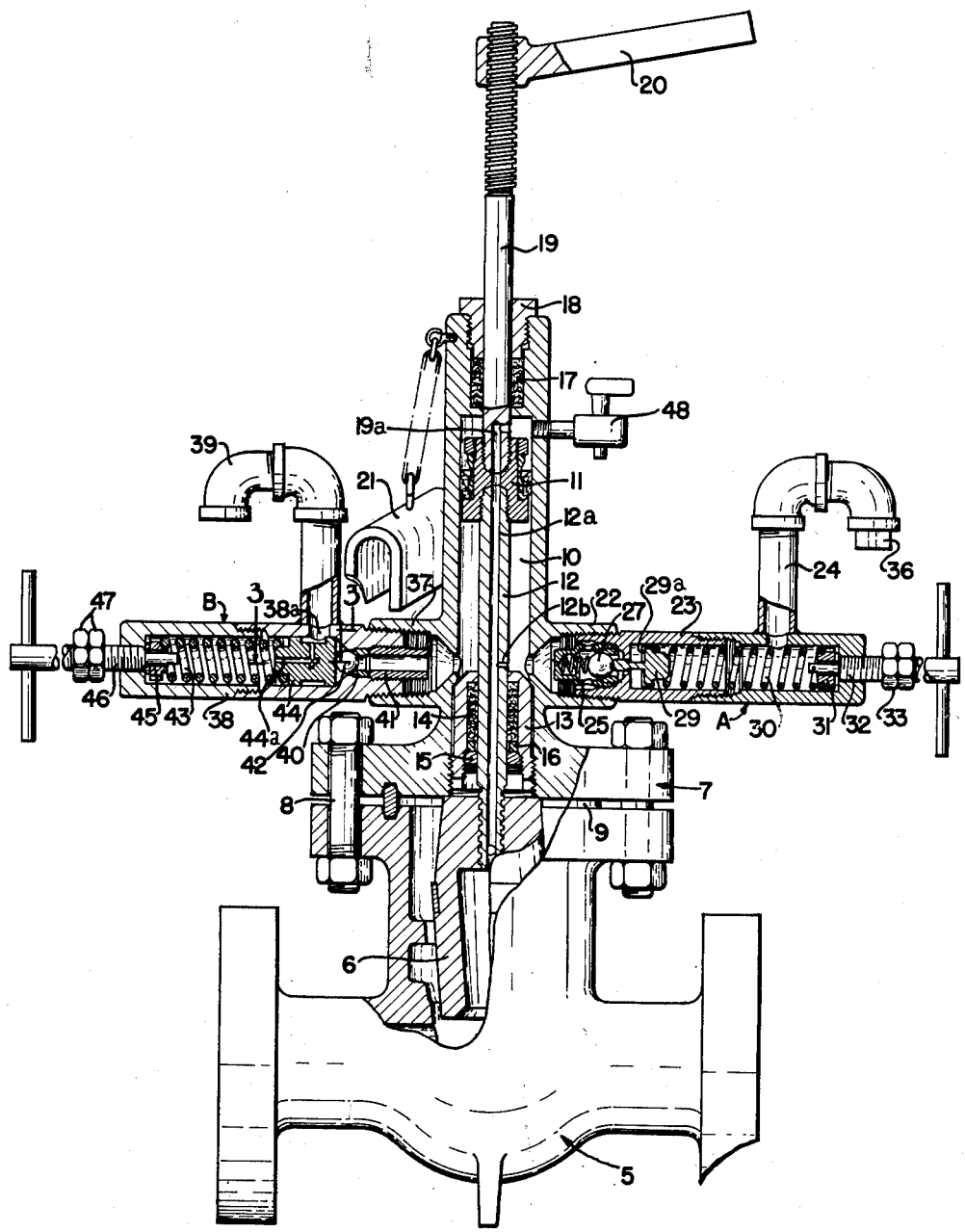
Fig. 1 is a side elevational view of a valve embodying this invention with parts shown in section.

Referring to the drawings, numeral 5 designates a valve body having a passageway therethrough and adapted to be connected in a high pressure pipe line or the like. The valve closure member 6 is illustrated as a gate and is adapted to seat across the passageway of valve body 5 to close the valve.

The valve bonnet or cap 7 may be secured to body 5 by bolts 8. The usual seal ring 9 is disposed between the confronting grooved surfaces of the flanges of the body and bonnet to provide a seal therebetween. The pressure actuated mechanism includes the chamber or cylinder 10 formed in the bonnet, and a pressure responsive member or one way piston 11 reciprocally mounted within chamber 10 and dividing it into upper and lower pressure compartments. The piston has an operable drive connected with valve closure member 6 through the stem 12 threaded at opposite ends to the piston and closure member. A stuffing box housing 13 is threaded into the lower portion of cylinder 10 and surrounds stem 12. Stuffing material or packing 14 is held within housing 13 by gland or nut 15 and a spacer ring may be utilized as shown at 16. The other end of cylinder 10 is provided with a seal in the form of stuffing or packing 17 and gland 18. The stuffing and gland surround an extension 19 of the valve stem which is threaded at one end to piston 11 and has a threaded portion which engages a handle 20. This extension and handle along with spacer element 21 provide a means for raising piston 11 and valve closure 6 as will be hereinafter more fully explained.

Pressure fluid is supplied to both of the compartments within chamber 10 by the axial passage 12a of stem 12, the central bore of piston 11 and the passage 19a of the stem extension. The radial bore 12b of stem 12 communicates between the lower compartment and the passage 12a. Obviously the lower end of passage 12a communicates with the interior of the valve body whereby the pressure within the compartments of chamber 10 will be substantially that within the valve body. It will be noted that the passage 12b, with the valve closure member in a raised position, is placed just above the upper end of stuffing box housing 13. Thus this compartment communicates with the interior of the body only when gate 6 and stem 12 are in their substantially raised positions. The packing 14 seals off the passage when stem 12 has been lowered somewhat. It is also preferable that the diameter of passage 12b is somewhat less than the narrowest portion of passage 19a and 12a. This insures a greater rate of supply of pressure fluid to the upper compartment than to the lower compartment. It is obvious that with the arrangement illustrated the fluid of the pipe line constitutes both the control fluid and the actuating fluid for the actuating mechanism.

In order to actuate the piston 11 by pressure to shift closure member 6 the pressure in one of the compartments is relieved to create a pressure differential across the piston. In the embodiment shown in the drawings, the piston is adapted to be moved from a raised to a lowered position and thereby shift closure member 6 from open to shut position when the control fluid pressure reaches predetermined limits. To accomplish this valve controlled vents are provided for the lower compartment. The auxiliary valves controlling the vents are responsive to the pressure of the control fluid and operate with a snap action. In the embodiment of the drawings two vents are provided, one of which is controlled by an auxiliary valve adapted to open when the pressure of the control fluid falls below a predetermined limit and designated generally as A. The auxiliary valve controlling the other vent is adapted to close when the control fluid exceeds a predetermined pressure and is indicated at B. It is contemplated that the vent A may in some instances be dispensed with where only high pressures are to be guarded against.

Figure 5:
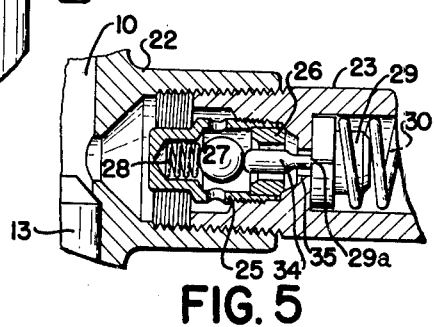
Fig. 5 is an enlarged fragmentary view of the low pressure responsive pressure release valve shown in Figs. 1 and 2.

Referring to the vent controlled by the low pressure relief valve it will be seen that bonnet 7 has a boss 22 surrounding an aperture communicating with the lower compartment of member 10. A two piece housing 23 has one end threaded to boss 22. Housing 23 has a bore of varying diameters which communicates with the lower compartment and with the atmosphere through the fitting 24. Valve cage 25 is threaded within the end of housing 23 and is surrounded by boss 22. The valve cage has radial ports and at its open end retains a seat ring 26 which is more clearly shown in Fig. 5. Ring 26 is held between an internal shoulder of cage 25 and a tapered portion of the bore of housing 23. A ball valve or member 27 is retained within cage 25 and is urged against the upstream side of seat ring 26 by a weak spring 28. Obviously the pressure differential across valve member 27 also resists unseating of the member.

In order that the ball valve may be unseated when the control pressure falls below a predetermined value a resilient element is provided for unseating ball 27. This resilient element includes block 29, coil spring 30 and block 31 secured to stem 32 which has a threaded engagement with one end of housing 23. Stem 32 carries lock nuts 33 which may be adjusted axially of the stem to determine the pressure at which valve 27 will be unseated. By advancing stem 32 until the so adjusted lock nuts 33 engage the housing the compression upon spring 30 may be adjusted to a selected value, thereby determining the force tending to unseat the ball valve 27 and establishing the minimum pressure necessary to be exerted against such valve to keep it seated. Block 29 has an extension 34, the head of which extends through a restriction 35 in the bore of housing 23 and engages ball valve 27. Thus compression of spring 30 urges the head of extension 34 against the ball valve in a direction to unseat the valve when the force exerted by spring 30 exceeds the force exerted by the pressure against the valve across the seat ring 26.

To insure snap action of the auxiliary valve the head of extension 34 substantially fills the restricted portion 35 of the housing bore until the extension has been advanced sufficiently to substantially unseat ball valve 27. With the ball valve substantially unseated the neck portion of the extension, which has a reduced diameter, extends through the restricted portion 35 of the housing bore, thus providing an annular space for the escape of fluid. This annular space must have a substantially greater area than the area of radial passage 12b of stem 12 to permit the quick release of pressure within the lower compartment of chamber 10. In this connection it is important that the head of extension 34 shall have a pressure face of substantially reduced area relative to the area of seat 26. Grooves 29a are provided in the face and periphery of block 29 to permit a free flow of fluid past block 29. It is sometimes desirable to restrict the flow through fitting 24 and for this purpose a removable choke plug 36 is provided for the free end of the fitting.

With reference to the vent for relieving the pressure within the lower compartment of chamber 10 when the control pressure exceeds a predetermined value a boss 37 has been provided opposite boss 22. Boss 37 surrounds an aperture which communicates between the lower compartment and the atmosphere through the bore of a two piece valve housing 38 and a fitting 39. A seat ring 40 is held against an internal shoulder in the bore of housing 38 by a ring insert 41 threaded in the open end of housing 38. A ball valve 42 is adapted to seat against the downstream side of ring 40. This arrangement is such that pressure within the lower compartment of chamber 10 urges ball valve 42 to an unseated position. A resilient element is provided to resist this unseating force and hold the valve seated until the pressure across the seat exceeds the force exerted by the resilient element. This resilient element constitutes a coil spring 43 held between blocks 44 and 45. Block 45 is carried at one end of an adjustment stem 46 threaded in the end of housing 38. Lock nuts 47 are provided to facilitate setting of stem 46 in a selected position, as a means of adjusting the compressive force which urges the ball valve 42 against its seat. Where desired suitable calibrated indicia may be employed.

This auxiliary valve is also arranged to open with a snap action to eliminate the possibility of throttling of valve 42 and closure 6. To accomplish this block 44 is reciprocally mounted within a bore of enlarged diameter of housing 38 relative to the area of seat ring 40. Block 42 substantially fills the enlarged portion of the bore giving the effect of a piston within a cylinder. The port 38a in the housing, which communicates with vent 39, is positioned so that block 44 covers the port until ball valve 42 has been substantially unseated. When leakage occurs past ball valve 42 pressure within the end of the enlarged portion of the bore of cylinder 38 adjacent seat 40 quickly builds up to substantially that of the lower compartment. This pressure is exerted against the face of block 44 which presents a greater area than that of the exposed portion of the ball valve when seated. Inasmuch as the pressure against the reduced area was great enough to collapse spring 43 somewhat obviously the enlarged area now exposed to this pressure results in an increased force tending to collapse spring 43 and permit full opening or unseating of valve member 42. In this position the port 38a is uncovered and the pressure fluid is vented to the atmosphere through fitting 39. Preferably a vent is provided for the cylinder of housing 38 to prevent building up of pressure in back of block 44. This may be accomplished by providing a passage 44a in the block which communicates between port 38a and the interior of that part of the housing 38 surrounding spring 43.

Figure 3:
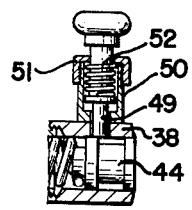
Fig. 3 is a view taken along the line 3—3 in Fig. 1 in the direction of the arrows.
Figure 4:
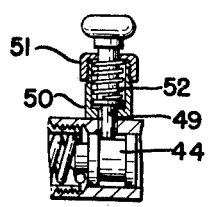
Fig. 4 is a view taken along the line 4—4 in Fig. 2 in the direction of the arrows.

Figs. 3 and 4 show a stop for retaining block 44 in a position with spring 43 collapsed. The stop includes a pin 49 supported by cylinder 50 and cap 51. The pin extends through an aperture in the housing 38 and is urged radially inwardly by a spring 52. When the block 44 has been pushed to the position shown in Fig. 4, spring 52 advances pin 49 into the space provided by the peripheral groove on block 44. Thus one of the shoulders defining the groove prevents the return of block 44 to reseat valve ball 42 when the pressure within the lower compartment of chamber 10 has been relieved. This lock or catch is usually not required when the installation is equipped with a vent which is controlled by a low pressure responsive auxiliary valve as when the pressure within the lower compartment of chamber 10 is sufficiently low that spring 43 would reseat valve 42 then the low pressure relief valve would be open to vent fluid from the lower compartment.

Figure 2:
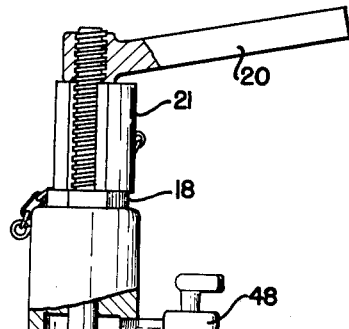
Fig. 2 is a view similar to Fig. 1 illustrating the actuating mechanism with the valve closure member in a seated position.

A manually operated means has been provided for shifting the stem 12 and extension 19 from a lower to a raised position and thus open the valve closure member 6. This comprises the spacer 21 shown in non-operative position in Fig. 1 and in an operative position in Fig. 2. To raise the stem and open the main valve, the spacer is placed about the extension 19 between the end of gland 18 and the head of handle 20. Rotation of handle 20 in a clockwise direction raises extension 19 and stem 12, as the spacer prevents lowering of the handle, forcing stem 12 upwardly to raise the closure member 6 to open position. The spacer 21 is then placed in inoperative position shown in Fig. 1 after the main valve has been opened. To facilitate raising the stems and closure member 6 a petcock 48 is provided at the upper end of chamber 10 to relieve the pressure from the upper compartment so that the pressure does not resist raising of the stem and closure member.

In operation the valve is first assembled in a manner which it is believed will be apparent to those skilled in the art from the foregoing description. After assembly and installation of the valve in a pipe line or other place of use the valve closure member 6 is raised to its open position by placing spacer 21 in the position shown in Fig. 2 by clockwise rotation of handle 20. Petcock 48 preferably is opened prior to the manipulation of handle 20. When the closure has been opened petcock 48 is closed and stems 32 and 46 are advanced within housings 23 and 38, respectively, until the lock nuts 33 and 47 engage the ends of their associated housings. Advancement of stem 32 compresses spring 30 to the point that block 29 and its extension 34 are in position to unseat valve ball 27 when the pressure of the fluid to be controlled (in this case the fluid of the pipe line) reaches a predetermined lower limit. Advancement of stem 46 is effective to seat ball 42 against the downstream side of seat ring 40. The tapered bore of housing 38 adjacent ring 40 facilitates shifting of ball 42 to seated position. This ball valve will remain seated until the pressure of the control fluid reaches a predetermined upper limit.

With equal pressure within the upper and lower compartments of chamber 10, the piston 11 is held in a raised position because stem 19 extends through the bonnet resulting in a smaller effective upper pressure face than lower pressure face. Thus closure 6 is normally held open.

Assuming that a break occurs in the pipe line in which the valve is installed whereby the pressure within the valve body drops, then leakage of fluid past ball valve 27 will substantially equalize the pressure on both sides of valve 27 as the enlarged head of extension 34 substantially fills the restricted portion 26 in the bore of housing 23. When this occurs the only force which tends to hold spring 30 in collapsed position is the force of the weak spring 28 and the force of the pressure acting against the head 34. Inasmuch as the area of the pressure face of head 34 is less than the area across seat 26 this force resisting spring 30 is less than the force previously overcome by the spring and extension 34 is advanced to completely or substantially unseat ball 27 with a snap action and substantially eliminate throttling of the ball valve. With the ball valve unseated the extension 34 has advanced through the restriction 35 so that the neck or reduced portion of the extension extends through the restricted portion 35 of the housing bore to provide an annular passage having a substantial cross sectional area. It is important that the junction between the head and neck portions of extension 34 be formed on a taper reducing the likelihood of the head becoming hung on a sharp edge or shoulder of the restricted portion 35 of the housing bore when the auxiliary valve is to be reset.

When ball valve 27 has been unseated pressure from within the lower compartment of chamber 10 is released through the vent 24. Thus a pressure differential is created in chamber 10 above piston 11. This pressure differential forces the piston downwardly. Its downward motion is transmitted to closure 6 through stem 12 to seat the closure and shut the valve. The passage 12b which supplies pressure fluid to the lower compartment of chamber 10 is quickly blocked off by the stuffing box 13 and packing 14 as stem 12 is lowered, breaking communication between the lower compartment of cylinder 10 and the interior of valve body 5.

The pressure differential created in the chamber 10 across piston 11 is sufficient to rapidly and positively shut valve closure member 6 especially where high pressures are controlled by the valve. This closing action is very rapid and it is often desirable, in order to protect the valve body 5 from undue shock, to restrict the passage of fitting 24 by use of the choke 36. This reduces the rate at which the pressure in the lower compartment of chamber 10 is relieved and thus slows down to some extent the speed at which the piston and valve closure 6 are lowered.

When it is desired to shift the valve closure member to its other position this may be accomplished manually as heretofore described.

Assuming now that in place of a sudden release of the control pressure the control pressure becomes excessive then the valve closure member will be shifted in response to this excessive pressure. The control pressure again is the pressure of the fluid to be controlled which is reflected in the lower compartment of chamber 10. This pressure acts upon ball valve 42 across an area as great as the area of the seat. When fluid leaks past the ball valve the pressure on both sides of the valve are substantially equalized very rapidly as block 44 obstructs the passage blocking port 38a. Block 44 has a pressure face of substantially increased area over that of the seat ring 40 whereby a greater force is transmitted to spring 43 tending to collapse the spring. This increased force substantially or completely unseats valve 42. With the ball valve in unseated position and block 44 retracted, pin 49 of the lock mechanism is advanced by spring 52 to engage the shoulder on the periphery of block 44 holding the block in retracted position with port 38a unobstructed. Pressure within the lower compartment of chamber 10 is quickly dissipated through fitting 39 and it is contemplated that when required a choke such as 36 may also be used to restrict the passage through fitting 39 and thus temper the speed or rapidity of shutting of the valve closure 6.

Release of pressure within the lower compartment of chamber 10 thus results in a pressure differential across piston 11 which forces the piston to a lower position driving the closure member, through stem 12, to its lower or shut position. The closure member may be shifted to its other position by manipulation of handle 20 in conjunction with spacer 21 as heretofore described but first the pin 49 should be released from engagement with block 44 by manually retracting the pin. With block 44 released spring 43 urges ball valve 42 into seated position against the downstream side of seat ring 40. The tapered wall of the bore of housing 48 adjacent the seat ring insures proper seating of ball valve 42.

It is contemplated that the arrangement of pressure supply and release connections for the compartments of chamber 10 may be so arranged as to create a pressure differential across piston 11 so as to shift the valve closure member from closed to open position in response to the pressure of the control fluid. In this case a suitable manual means will be utilized to shift the closure member from open to closed position as will be well understood by those skilled in the art.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described my invention, I claim:

1. In a valve having a closure member and a pressure actuated means comprising opposed compartments with means for pressurizing the compartments with a control fluid and a pressure responsive member therebetween adapted to be energized by a pressure differential thereacross; an operable drive connection between the pressure responsive member and closure member, control means for the pressure actuated means including a vent for one of the compartments, an auxiliary snap action valve controlling said vent, said valve exposed and responsive to the pressure within one of said compartments and adapted to open when said control pressure reaches a predetermined limit to energize the pressure actuated means and shift the closure member, and means for closing off the means for pressurizing the compartment which includes the vent upon shifting of the closure member to closed position.

2. In combination, a valve having a closure member, actuating mechanism for the valve responsive to the pressure of a control fluid, said mechanism comprising a chamber, a pressure responsive member therein dividing the chamber into separate pressure compartments, a connection for supplying fluid under pressure to the compartments, snap action valve means for relieving the pressure within one of the compartments to create a pressure differential across the pressure responsive member when the pressure of said control fluid reaches a predetermined limit to provide positive actuation of the valve closure member, and means for closing off the portion of the connection which supplies fluid under pressure to the compartment which has its pressure relieved by the snap action valve means when the closure member is shifted to closed position.

3. In combination a valve having a closure member, actuating mechanism for the valve responsive to the pressure of the fluid to be controlled comprising a chamber, a pressure responsive member therein dividing the chamber into separate pressure compartments, connections providing communication between the compartments and the controlled fluid, a vent connected to one of the compartments for relieving the pressure therein, snap action valve means controlling the vent, said valve means responsive to the pressure of the controlled fluid and adapted to open the vent when the pressure of the controlled fluid reaches a predetermined limit, and means for closing off the connection which provides communication between the fluid to be controlled and the compartment connected to the vent when the closure member is shifted to closed position.

4. In combination, a valve having a closure member and pressure responsive actuating means therefor, said means including a chamber, a pressure responsive member therein dividing the chamber into two pressure compartments, each compartment communicating with the fluid to be controlled, an operable actuating connection between the pressure responsive member and valve closure member, a vent means for one of the compartments, auxiliary snap action valve means controlling the vent means, said valve means adapted to open to relieve the pressure within said one compartment when the pressure of the controlled fluid varies from a predetermined range, whereby a pressure differential is created across the pressure responsive member to actuate the valve closure, and means for closing off communication between the fluid to be controlled and the compartment having the vent means when the closure member is moved to closed position.

5. A pressure responsive actuating mechanism for the closure member of a valve comprising a chamber, a pressure responsive member within the chamber, an operable connection carried by the pressure responsive member and engageable with the valve closure member whereby movement of the pressure responsive member will shift the closure member, passages for supplying fluid under pressure to the chamber on both sides of the pressure responsive member, an opening in the chamber on one side of the pressure responsive member, a snap action auxiliary valve controlling the opening, said auxiliary valve responsive to pressure in said opening and adapted to open when the pressure at the opening reaches a predetermined limit to relieve the pressure within the chamber on the side of the pressure responsive member on which the opening is located whereby the pressure responsive member is energized by the pressure differential thereacross, and means for closing off the passage supplying fluid under pressure to the chamber on the side of the pressure responsive member of the opening controlled by the snap action auxiliary valve when the closure member is shifted to closed position.

6. Mechanism as in claim 5 wherein the chamber is a cylinder and the pressure responsive member is a piston mounted for reciprocation therein.

7. A pressure responsive actuating mechanism for the closure member of a valve comprising a chamber, a pressure responsive member within the chamber, an operable connection carried by the pressure responsive member and engageable with the valve closure member whereby movement of the pressure responsive member shifts the closure member to open and closed position, passages for supplying fluid under pressure to the chamber on both sides of the pressure responsive member, an opening in the chamber on one side of the pressure responsive member, and a snap action auxiliary valve controlling the opening, said auxiliary valve responsive to pressure at said opening and adapted to open when the pressure at the opening exceeds a predetermined limit to relieve the pressure within the chamber on the side of the pressure responsive member on which the opening is located whereby the pressure responsive member is energized by the pressure differential thereacross.

8. Mechanism as in claim 7 where the chamber is a cylinder and the pressure responsive member is a piston mounted for reciprocation therein.

9. In a valve having a valve closure, pressure actuated means for shifting the valve closure including two pressure compartments with a pressure responsive member therebetween, an operable actuating connection between the valve closure and the pressure responsive member, means for supplying a control fluid at elevated pressure to the compartments, snap action means for relieving the pressure from one compartment when the pressure of the control fluid reaches a predetermined limit whereby the pressure responsive member is actuated to shift the closure and means for closing off the means for supplying a controlled fluid to that compartment which may have the pressure relieved by the snap action means when the closure is shifted to closed position.

10. In a valve having a valve closure, pressure actuated means for shifting the valve closure including two pressure compartments with a pressure responsive member therebetween, an operable actuating connection between the valve closure and the pressure responsive member, means for supplying the fluid controlled by the valve at elevated pressure to the compartments, a vent for one compartment, a snap action auxiliary valve controlling the vent, said auxiliary valve responsive to the pressure of the controlled fluid when the controlled fluid pressure reaches a predetermined limit and means for closing off the means for supplying fluid controlled by the valve to the compartment having the vent when the valve closure is shifted to closed position.

11. In a valve having a valve closure, pressure actuated means for shifting the valve closure including two pressure compartments with a pressure responsive member therebetween, an operable actuating connection between the valve closure and pressure responsive means, means for supplying controlled fluid to the compartments, a passage communicating between one compartment and the exterior of the valve, an auxiliary valve in the passage comprising a seat in the passage, a snap action valve member engageable with the seat on the downstream side, a resilient element urging the valve member to seated position, whereby the auxiliary valve is opened when the pressure of the controlled fluid exceeds a predetermined limit to relieve the pressure within said one compartment actuating the pressure responsive member to shift the valve closure.

12. In a valve having a valve closure, pressure actuated means for shifting the valve closure including two pressure compartments with a pressure responsive member therebetween, an operable actuating connection between the valve closure and pressure responsive member, means for supplying controlled fluid to the compartments, a passage communicating between one compartment and the exterior of the valve, an auxiliary valve in the passage comprising a seat in the passage, a valve means having a part engageable with the seat and movable therefrom by the pressure differentially thereacross, a portion of relatively larger area than said part substantially blocking the passage downstream from said part except when the valve means is substantially open, whereby said valve means will open with a snap action upon substantial leakage between said part and seat.

13. In a valve having a valve closure, pressure actuated means for shifting the valve closure including two pressure compartments with a pressure responsive member therebetween, an operable actuating connection between the valve closure and pressure responsive member, means for supplying controlled fluid to the compartments, a passage communicating between one compartment and the exterior of the valve, an auxiliary valve in the passage comprising a seat in the passage, a valve member engageable with the seat on the downstream side and movable from the seat by the pressure retained thereby, and a spring pressed element opposing movement of said valve member from its seat and substantially blocking the passage with the valve member just moved from its seat sufficiently to permit leakage therepast and presenting a large pressure area within the passage relative to the area of the seat insuring a complete snap action unseating of the valve member, said element in a position with the valve member completely unseated providing opening of the passage with a cross sectional area great enough to rapidly relieve the pressure from said one compartment.

14. In a valve having a valve closure, pressure actuated means for shifting the valve closure including two pressure compartments with a pressure responsive member therebetween, an operable actuating connection between the valve closure and pressure responsive member, means for supplying controlled fluid to the compartments, a passage communicating between one compartment and the exterior of the valve, an auxiliary valve controlling the passage comprising a seat in the passage, a valve member engageable with the seat on the downstream side, and a spring pressed element substantially blocking the passage with the valve member just moved from its seat sufficiently to permit leakage therepast and presenting a large pressure area within the passage relative to the area of the seat insuring a complete snap action unseating of the valve member, said element in a position with the valve member completely unseated providing opening of the passage with a cross sectional area great enough to rapidly relieve the pressure from said one compartment, and lock means for holding the spring pressed element in collapsed position.

15. A safety flow controller comprising a main valve, fluid actuated means for closing the main valve including a pressure responsive member connected to the main valve and operably mounted within a chamber to provide opposed pressure faces, means for supplying pressure fluid to both faces substantially equally, a vent for rapidly relieving the pressure on one pressure face, a pressure relief valve controlling the vent and adapted to open upon occurrence of a predetermined pressure limit at the vent, and means for closing off communication between the pressure supply means and the vent when the main valve is closed.

16. As a subcombination actuating mechanism for a valve comprising a bonnet member mountable upon a valve, a pressure chamber within the bonnet, a pressure responsive member within the chamber, an actuating rod connected to the pressure responsive member and extending exteriorly of the bonnet, a packing providing a sliding seal between the bonnet and the rod, the rod formed with a passage extending from the chamber on the side of the pressure responsive member remote from the packing to the other side of the packing and a lateral opening located in the rod so as to communicate between the passage and the chamber in one extreme position of the pressure responsive member and to be maintained out of communication therewith by the packing in another extreme position of the pressure responsive member, said bonnet having an opening of greater capacity than said lateral opening and communicating with the chamber on the same side of the pressure responsive member as the lateral opening does.

17. In a pressure responsive valve having a body, a passage therethrough, a seat in the passage, a valve member, said valve member so constructed and arranged within the passage as to engage the seat to close the passage and to be moved from the seat in an upstream direction to open the passage, the valve member when seated being urged to seated position by a force due to the pressure differential in the fluid on both sides of the seated valve acting on the area of the valve member within the seat, a resilient means engageable with the valve member to urge it in a direction opposed to the pressure differential across the seated valve member, the improvement which resides in the combination therewith of a part carried by the resilient means which substantially blocks the passage except when the valve member is in substantially full open position, said part shielded from the pressure upstream of the seat with the valve member seated and having a surface of substantially smaller area than the area of the seat exposed to the upstream pressure when substantial leakage occurs past the seat whereby the force opposing the resilient means is decreased on partial unseating of the valve member to provide an increased resultant force in a direction to unseat the valve member.

18. A pressure responsive valve comprising a body, a passage through the body, a seat in the passage, a valve member, said valve member so constructed and arranged within the passage as to engage the seat to close the passage and to be moved from the seat in an upstream direction to open the passage, the valve member when seated being urged to seated position by a force due to the pressure differential in the fluid on both sides of the seated valve acting on the area of the valve member within the seat, means exerting a force against the valve member tending to unseat the valve member and opposing the force due to the pressure differential across the valve member and means including a part substantially obstructing the passage downstream from the valve member, said part being movable to a position within the passage providing a greater area of opening of the passage when the valve member moves to full open position, said part having a smaller area than the area within the seat, said means providing a reduction in the magnitude of the force due to the pressure differential upon unseating of the valve member to the extent that at least substantial leakage past the valve member occurs whereby the valve member will open with a snap action.

19. A valve as in claim 18 wherein the means exerting the unseating force on the valve member is adjustable as to magnitude of its force providing for variation of the critical pressure at which the valve will open.

20. A pressure responsive valve comprising a body, a passage through the body, a valve member and seat controlling the passage, said valve member so constructed and arranged within the passage as to engage the seat to close the passage and to be moved from the seat in an upstream direction to open the passage, the valve member when seated being urged to seated position by a force due to the pressure differential in the fluid on both sides of the seated valve acting on the area of the valve member within the seat, a block in the passage downstream of the seat, a resilient element urging the block against the valve member in a direction to unseat the valve member, said block substantially obstructing the passage except with the valve member substantially removed from the seat whereby upon slight unseating of the valve member the pressure substantially equalizes both upstream and downstream of the valve member so it may be rapidly moved to unseating position by the resilient element.

21. A pressure responsive valve comprising a body, a passage through the body, a seat in the passage, a valve member, said valve member so constructed and arranged within the passage as to engage the seat to close the passage and to be moved from the seat in an upstream direction to open the passage, the valve member when seated being urged to seated position by a force due to the pressure differential in the fluid on both sides of the seated valve acting on the area of the valve member within the seat, a block in the passage downstream of the seat, a resilient element urging the block against the valve member in a direction to unseat the valve member, and having an effective pressure surface exposed to the pressure downstream of the seat which is less than the area of the seat, said block substantially obstructing the passage with the valve member seated but not materially obstructing the passage with the valve member substantially removed from the seat whereby upon slight unseating of the valve member the pressure substantially equalizes both upstream and downstream of the valve member resulting in a reduced force opposing the resilient element to provide for snap action of the valve member.

22. In a valve having a closure member and a pressure actuated means comprising opposed compartments with means for pressurizing the compartments with a control fluid and a pressure responsive member therebetween adapted to be energized by a pressure differential thereacross; an operable drive connection between the pressure responsive member and closure member adapted to move the closure member to open and closed positions as the pressure responsive member is moved to its extreme positions, control means for the pressure actuated means including a vent for one of the compartments, an auxiliary snap action valve controlling said vent, said valve exposed and responsive to the control pressure adapted to open when said control pressure reaches a predetermined lower limit to energize the pressure actuated means and shift the closure member, and means automatically closing off the means for pressurizing the compartment having the vent when the closure member has been shifted to closed position.

23. A pressure responsive actuating mechanism for the closure member of a valve comprising a chamber, a pressure responsive member within the chamber, an operable connection carried by the pressure responsive member and engageable with the valve closure member whereby movement of the pressure responsive member will shift the closure member, passages for supplying fluid under pressure to the chamber on both sides of the pressure responsive member, an opening in the chamber on one side of the pressure responsive member, a snap action auxiliary valve controlling the opening, said auxiliary valve responsive to pressure in said opening and adapted to open when the pressure at the opening reaches a predetermined lower limit to relieve the pressure within the chamber on the side of the pressure responsive member on which the opening is located whereby the pressure responsive member is energized by the pressure differential thereacross and means for closing the passage applying pressure fluid to the chamber on the side of the piston on which the opening resides when the closure member of the valve is shifted to closed position.

24. In a valve having a valve closure, pressure actuated means for shifting the valve closure including two pressure compartments with a pressure responsive member therebetween, an operable actuating connection between the valve closure and the pressure responsive member to cause the valve closure to move upon actuation of the latter, means for supplying a control fluid at elevated pressure to the compartments, snap action means for relieving the pressure from one compartment when the pressure of the control fluid reaches a predetermined lower limit whereby the pressure responsive member is actuated to shift the closure, and means for closing the means for admitting control fluid to the compartment to be relieved when the valve closure is shifted to closed position.

25. In a valve having a valve closure, pressure actuated means for shifting the valve closure including two pressure compartments with a pressure responsive member therebetween, an operable actuating connection between the valve closure and the pressure responsive member to provide for movement of the valve closure upon actuation of the latter, means for supplying the fluid controlled by the valve at elevated pressure to the compartments, a vent for one compartment, a snap action auxiliary valve controlling the vent, said auxiliary valve responsive to the pressure of the controlled fluid when the controlled fluid pressure reaches a predetermined lower limit, and means for closing the means for supplying fluid controlled to the compartment having the vent when the valve closure is moved to closed position.

26. In a valve a body with a passageway therethrough and a valve closure operably mounted to control the passageway, means for actuating the valve closure including a chamber with a pressure responsive member therein dividing it into two compartments, means for supplying a control fluid under the same pressure to both compartments, means providing a drive connection between the pressure responsive member and the valve member whereby movement of the drive connection actuates the closure member, pressure responsive means sensitive to the pressure within one of the compartments for suddenly creating a pressure differential across the pressure responsive member when the pressure within said one compartment falls below a predetermined value, and means associated with the drive connection for closing off the controlled fluid supply means from the compartment to be relieved when the drive connection is shifted in valve closing direction.

27. A safety flow controller comprising a main valve, fluid actuated means for closing the main valve including a pressure responsive member connected to the main valve and operably mounted within a chamber to provide opposed pressure faces, means for supplying pressure fluid to both faces substantially equally, a vent for rapidly relieving the pressure on one pressure face, a pressure relief valve controlling the vent and adapted to open upon occurrence of a predetermined low pressure limit at the vent, and means for closing off communication between the pressure supply means and the vent when the main valve is closed.

28. A safety flow controller comprising a main valve, fluid actuated means for closing the main valve including a pressure responsive member connected to the main valve and operably mounted within a chamber to provide opposed pressure faces, means for supplying pressure fluid to both faces substantially equally, a vent for rapidly relieving the pressure on one pressure face, a pressure relief valve controlling the vent and adapted to open upon occurrence of a predetermined low pressure limit at the vent, said relief valve comprising a seat disposed transversely of the vent passage and facing upstream in the passage, a valve member so constructed and arranged within the passage as to engage the seat to close the passage and to be moved from the seat in an upstream direction to open the passage, the valve member when seated being urged to seated position by a force due to the pressure differential in the fluid on both sides of the seated valve acting on the area of the valve member within the seat, means exerting a force against the valve member tending to unseat the valve member and opposing the force due to the pressure differential across the valve member and means including a part substantially obstructing the passage downstream from the valve member, said part being movable to a position within the passage providing a greater area of opening of the passage when the valve member moves to full open position, said part having a smaller area than the area within the seat, said means providing a reduction in the magnitude of the force due to the pressure differential upon unseating of the valve member to the extent that at least substantial leakage past the valve member occurs whereby the valve member will open with a snap action to provide a maximum opening of the vent passage with a cross-sectional area great enough to rapidly bleed the pressure to which said one pressure face is exposed.

HERBERT C. OTIS.

REFERENCES CITED

The following references are of record in the file of this patent:

UNITED STATES PATENTS

| Number | Name | Date |
|---|---|---|
| 871,260 | Dyer | Nov. 19, 1907 |
| 901,222 | Anderson | Oct. 13, 1908 |
| 1,084,940 | Jahn | Jan. 20, 1914 |
| 1,167,287 | Ford | Jan. 4, 1916 |
| 1,319,154 | Johnson | Oct. 21, 1919 |
| 1,433,416 | Reed | Oct. 24, 1922 |
| 2,092,452 | Gilbert | Sept. 7, 1937 |
| 2,357,215 | Maronek | Aug. 29, 1944 |

FOREIGN PATENTS

| Number | Country | Date |
|---|---|---|
| 34,212 | Denmark | Feb. 18, 1925 |
| 244,260 | Great Britain | Dec. 17, 1925 |